(12) United States Patent
Damarla

(10) Patent No.: US 8,194,501 B2
(45) Date of Patent: Jun. 5, 2012

(54) APPARATUS AND METHOD OF SNIPER LOCALIZATION

(75) Inventor: Thyagaraju Damarla, Laurel, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 211 days.

(21) Appl. No.: 12/625,124

(22) Filed: Nov. 24, 2009

(65) Prior Publication Data

US 2011/0122730 A1    May 26, 2011

(51) Int. Cl.
*G01S 3/80* (2006.01)
(52) U.S. Cl. .......................................... 367/127
(58) Field of Classification Search ............... 367/127
See application file for complete search history.

(56) References Cited

U.S. PATENT DOCUMENTS

| | | | |
|---|---|---|---|
| 5,258,962 A * | 11/1993 | Karlsen | 367/127 |
| 5,930,202 A * | 7/1999 | Duckworth et al. | 367/127 |
| 6,178,141 B1 * | 1/2001 | Duckworth et al. | 367/127 |
| 2003/0008265 A1 * | 1/2003 | Hulet | 434/14 |
| 2006/0044943 A1 * | 3/2006 | Barger et al. | 367/127 |
| 2007/0030763 A1 * | 2/2007 | Barger et al. | 367/127 |
| 2009/0285055 A1 * | 11/2009 | Barger et al. | 367/188 |

FOREIGN PATENT DOCUMENTS

WO    WO 0073811 A1 * 12/2000

* cited by examiner

*Primary Examiner* — Thomas Tarcza
*Assistant Examiner* — James Hulka
(74) *Attorney, Agent, or Firm* — Alan I. Kalb (57) ABSTRACT

An apparatus and method of sniper localization includes an internal clock; an acoustic sensor positioned in a known location and detecting pressure waves; a first processor determining the trajectory of the supersonic projectile, where the first processor includes a shock wave threshold detector receiving time series information and recording arrival times of shock wave components of the pressure waves; a blast threshold detector receiving the time series information and recording arrival times and amplitude information of blast wave components of the pressure waves; a discrimination processor discriminating between a blast wave, a shock wave, or neither, and storing arrival times of each of the potential blast wave components classified as the blast wave; and a localization estimation processor calculating an estimated trajectory of the projectile based on the blast wave and the shock wave arrival times and calculating an estimated firing position of the projectile.

8 Claims, 6 Drawing Sheets

APPARATUS AND METHOD OF SNIPER LOCALIZATION

GOVERNMENT INTEREST

The embodiments herein may be manufactured, used, and/or licensed by or for the United States Government without the payment of royalties thereon.

BACKGROUND

1. Technical Field

The embodiments herein generally relate to law enforcement technologies and security, and more particularly to techniques for determining the origin and direction of travel of supersonic projectiles.

2. Description of the Related Art

Systems and methods are known that can determine the general location of the sniper and trajectory of supersonic projectiles, such as bullets and artillery shells, by measuring parameters associated with the shockwave generated by a projectile. Current systems, however, generally require a distributed array of acoustic sensors to detect the arrival times, amplitudes and frequency characteristics of a projectile's shockwave and the muzzle blast from a firearm. In addition, such systems typically require real-time operating systems (e.g., UNIX, LINUX, etc.) and generally require an elaborate time synchronization mechanism so that all the deployed sensors have a common time reference to determine the exact time of arrival for both shockwave and the muzzle blast for supersonic gun fire with common reference time frame.

Conventional systems typically employ an antenna with a plurality of acoustic sensors, which can be relatively closely spaced (e.g., 1 meter apart) or widely dispersed (e.g., mounted on a vehicle or carried by soldiers on a battlefield), with each sensor measuring shockwave pressure omni-directionally at its respective location. One exemplary antenna may include, for example, a total of seven omni-directional microphones, with six microphones distributed over the surface of a sphere (approx. diameter 1 m) and the seventh microphone located in the center of the sphere. Other exemplary antennae employ four microphones arranged in a tetrahedron formation that are amenable to carry on by a person. In general, the microphones in existing systems are arranged in an array configuration and their output is collected by a common data collection unit with a common time reference. Additionally, existing array based sniper localization systems require the orientation of the array with respect to true north to be determined in order to estimate the location of the sniper and the trajectory of the bullet.

Such array based sensors systems, however, are less suitable for man-wearable systems. In addition, when the sensors are distributed, time synchronization among the sensors is critical. If an operating system that is not a real-time operating system is employed (e.g., Windows® CE operating system), the synchronization among the sensors is not guaranteed. As a result, the time of arrival estimates of different events (e.g., shockwave and the muzzle blast from a firearm) could be off by 1-2 seconds making the localization of the firearm impossible.

SUMMARY

In view of the foregoing, an embodiment herein provides a system comprising several acoustic sensors distributed over an area, for determining the trajectory of a supersonic projectile and firing position of the trajectory. Each acoustic sensor comprising: an internal clock; an acoustic sensor positioned in a known location and encountering pressure waves generated by the supersonic projectile passing proximate to the acoustic sensor, the acoustic sensor comprising a transducer collecting pressure wave information and generating pressure wave information signals in response to the pressure waves, the pressure wave information signals having a time series information signal calibrated to the internal clock; a first processor processing the time series information signal to provide parameter information for determining the trajectory of the supersonic projectile; the first processor comprising: a shock threshold detector receiving the time series information and recording arrival times of shock wave components of the pressure waves; a blast threshold detector receiving the time series information and recording arrival times and amplitude information of potential blast wave components of the pressure waves; a discrimination processor discriminating the potential blast wave components to classify each of the potential blast wave components as a blast wave, a shock wave, or neither, and storing arrival times of each of the potential blast wave components classified as the blast wave; and a localization estimation processor calculating an estimated trajectory of the projectile based on the blast wave and the shock wave arrival times and calculating an estimated firing position of the projectile.

In such a system, each acoustic sensor would determine the time difference of arrival (TDOA) between the muzzle blast and shockwave time of arrivals. These measured TDOAs from several acoustic sensors are used to estimate the location of the sniper and the trajectory of the bullet. In such a system, the localization estimation processor may calculate an initial miss-angle (gamma γ), the angle between the trajectory and the line joining the sensor and the firing position, and may estimate and calculate the estimated trajectory of the projectile and the estimated firing position of the projectile from the initial gamma estimate. Additionally, the initial gamma estimate may equal 0.01. In addition, the localization estimation processor may estimate a minimum and a maximum distance of the estimated firing position of the projectile. Furthermore, the maximum distance of the estimated firing position of the projectile may be set to a maximum detection range of the acoustic sensor. Moreover, the maximum distance of the estimated firing position of the projectile may be set to 500 meters.

Furthermore, the localization estimation processor may calculate the trajectory vector $\tilde{U}$, further it may calculate $\tilde{\gamma}_k$ using $\tilde{U}$, further it may calculate the firing position $\tilde{Z}$ using $\tilde{\gamma}_k$ and TDOAs, which is further used to estimate the miss-angle $\hat{\gamma}$ which is further utilized to compute $\tilde{U}$ in a continuous loop until the $$g(num) = \sum_{k=1}^{N} |\tilde{\gamma}_k - \hat{\gamma}_k|$$

is minimum. Preferably, if the $\tilde{Z}$ corresponds to the actual firing position $\tilde{\gamma}_k$ and $\hat{\gamma}$ should be equal. Moreover, the localization estimation processor may output the estimated firing position of the projectile based on the initial gamma estimate when the localization estimation processor determines the calculated g(num) is less than the initial gamma estimate, otherwise the localization estimation processor may calculate the estimated firing position of the projectile based on the initial gamma estimate when the localization estimation processor determines the calculated g(num) is less than the initial gamma estimate, otherwise calculating the estimated firing position of the projectile from a new gamma chosen from estimated minimum and the maximum distance of Ok estimated firing position of the projectile.

Another embodiment herein also provides a method for estimating a firing position of a supersonic projectile, the projectile producing a pressure wave, the pressure wave comprising at least a shock wave and a blast wave, the method comprising: positioning a single acoustic sensor in a known location; generating a pressure wave information signal at the acoustic sensor in response to the pressure wave; filtering unwanted harmonics in the pressure wave information signal; converting the filtered pressure information signal into a time series signal; recording shock wave arrival times of shock wave components of the pressure wave; recording blast wave arrival times of blast wave components of the pressure wave; determining a shock wave arrival time of the shock wave components and a blast wave arrival time of the blast wave components; and calculating an estimated firing position of the projectile based on the shock wave arrival time and the blast wave arrival times.

According to such a method, calculating an estimated firing position of the projectile may comprise: calculating an initial gamma estimate; and calculating the estimated firing position of the projectile from initial gamma estimate. In addition, the initial gamma estimate may equal 0.01. Furthermore, calculating an estimated firing position of the projectile may comprise estimating a minimum and a maximum distance of the estimated firing position of the projectile. Moreover, calculating an estimated firing position of the projectile may comprise calculating $$g(num) = \sum_{k=1}^{N} |\hat{\gamma}_k - \tilde{\gamma}_k|$$

from the estimated firing position of the projectile based on the initial gamma estimate. In addition, calculating an estimated firing position of the projectile may comprise: outputting the estimated firing position of the projectile based on the initial gamma estimate when the localization estimation processor determines the calculated g(num) is less than the initial gamma estimate, otherwise calculating the estimated firing position of the projectile from a new gamma chosen from the estimated minimum and the maximum distance of the estimated firing position of the projectile.

Another embodiment herein also provides a method for estimating a sniper position firing a supersonic projectile, the projectile producing a pressure wave, the pressure wave have at least a shock wave and a blast wave and the pressure wave is detected by an acoustic sensor, the method comprising: setting an initial value for a miss angle, $\gamma_1$; determining a value for an intercept angle, $\theta$; computing q, where $q=1-\sin(\theta+\gamma_1)$; computing an initial estimate of the sniper position based on the $\gamma_1$ and the q; determining an initial estimate for a minimal distance of the sniper position measured from the acoustic sensor and a maximum distance of the sniper position measured from the acoustic sensor, based on the $\gamma_1$ and the q; calculating an adjusted miss angle, $\gamma_2$, based on coordinates bounded by the minimal distance of the sniper position and the maximum distance of the sniper position; and searching an area bounded by the minimal distance of the sniper position and the maximal distance of the sniper position for a global a minimum value of $\gamma_2$.

According to such a method, setting an initial value for miss angle $\gamma$ may set $\gamma_k=\gamma$, for all k, may set $\gamma_1$ to 0.01. In addition, computing an initial estimate of the sniper position based on the $\gamma_1$ and the q may comprise computing:

$$2\begin{bmatrix} (\bar{S}_1 - \bar{S}_2)^T \\ \vdots \\ (\bar{S}_1 - \bar{S}_N)^T \\ (\bar{S}_2 - \bar{S}_3)^T \\ \vdots \\ (\bar{S}_{N-1} - \bar{S}_N)^T \end{bmatrix} [Z] = \begin{bmatrix} \left(\frac{d_2}{q_2}\right)^2 - \left(\frac{d_1}{q_1}\right)^2 + \|\bar{S}_1\|^2 - \|\bar{S}_2\|^2 \\ \vdots \\ \left(\frac{d_N}{q_N}\right)^2 - \left(\frac{d_1}{q_1}\right)^2 + \|\bar{S}_1\|^2 - \|\bar{S}_N\|^2 \\ \left(\frac{d_3}{q_3}\right)^2 - \left(\frac{d_2}{q_2}\right)^2 + \|\bar{S}_2\|^2 - \|\bar{S}_3\|^2 \\ \vdots \\ \left(\frac{d_N}{q_N}\right)^2 - \left(\frac{d_{N-1}}{q_{N-1}}\right)^2 + \|\bar{S}_{N-1}\|^2 - \|\bar{S}_N\|^2 \end{bmatrix},$$

where N is the number of acoustic sensors, $S_k$ is a position of the $k^{th}$ acoustic sensor, Z is an estimate of the sniper position, $d_k=v(T_k-t_k)$, v is the propagation velocity of sound, $T_k$ and $t_k$ are the time of arrival (TOA) of muzzle blast and the shockwave respectively, and $q_1=\ldots=q_N=q$ where $q=1-\sin(\theta+\gamma_1)$.

Moreover, the computing an initial estimate of the sniper position based on the $\gamma_1$ and the q may comprise computing:

$$\hat{\gamma}_k = \sin^{-1}\left(1 - \frac{d_k}{\|\bar{S}_k - \tilde{Z}\|}\right) - \theta,$$

$$\forall k = \{1, 2, \ldots, N\},$$

where k is the acoustic sensor, $\bar{S}_k$ is a three-dimensional position vector of the $k^{th}$ sensor S, $\tilde{Z}$ is the initial estimate of the sniper position. Furthermore, the computing an initial estimate of the sniper position based on the $\gamma_1$ and the q may comprise computing:

$$\begin{bmatrix} (\bar{S}_1 - \tilde{Z})^T \\ (\bar{S}_2 - \tilde{Z})^T \\ \vdots \\ (\bar{S}_N - \tilde{Z})^T \end{bmatrix} [\tilde{U}] = \begin{bmatrix} \|\bar{S}_1 - \tilde{Z}\|\cos\hat{\gamma}_1 \\ \|\bar{S}_2 - \tilde{Z}\|\cos\hat{\gamma}_2 \\ \vdots \\ \|\bar{S}_N - \tilde{Z}\|\cos\hat{\gamma}_N \end{bmatrix},$$

$\tilde{Z}$ is the initial estimate of the sniper position, d is an estimated distance, $\tilde{U}$ is an estimated trajectory of the projectile, and $\hat{\gamma}_k$ is an estimate of $\gamma_1$. Additionally, the computing an initial estimate of the sniper position based on the $\gamma_1$ and the q may comprise computing:

$$\check{\gamma}_k = \cos^{-1}\left[\frac{(\bar{S}_k - \tilde{Z})^T \tilde{U}}{\|\bar{S}_k - \tilde{Z}\|}\right],$$

$\check{\gamma}_k$ is an estimate of $\gamma_1$ that includes $\tilde{U}$.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a sniper localization system using distributed single microphone sensors or handheld computing devices (e.g., a personal digital assistant or "PDA") using only time differences of arrival ("TDOA") between the shockwave and muzzle blast at each sensor. In addition, a sniper localization method using only the TDOA for determination of the sniper location and does not require the time synchronization across multiple sensors is described herein. Referring now to the drawings, and more particularly to FIGS. 1 through 6, where similar reference characters denote corresponding features consistently throughout the figures, there are shown preferred embodiments.

Figure 1:
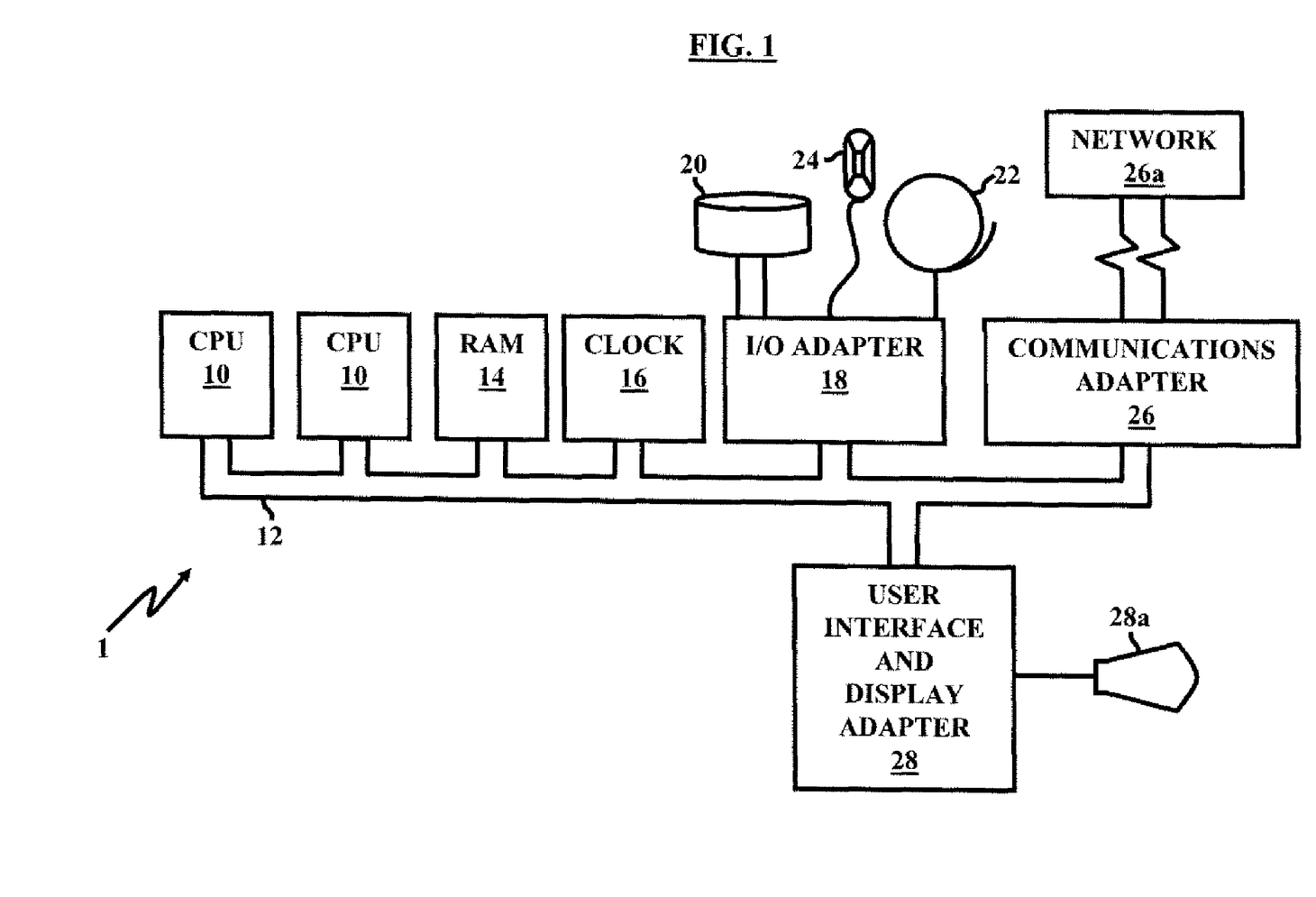
FIG. 1 illustrates a schematic diagram of a sniper localization apparatus according to an embodiment herein.

FIG. 1 illustrates a schematic diagram of a sniper localization apparatus 1 according to an embodiment. Sniper localization apparatus 1 is a device, preferably embodied as a handheld device; that comprises at least one processor or central processing unit (CPU) 10. The CPUs 10 are interconnected via system bus 12 to various devices such as a random access memory (RAM) 14, internal clock 16 and an input/output (I/O) adapter 18. Sniper localization apparatus 1 can read inventive instructions (as described further below) on RAM 14 and follow these instructions to execute the methodology of the embodiments herein. Internal clock 16 of sniper localization apparatus 1 is sufficiently stable to determine the TDOA between the shockwave and the muzzle blast of a firearm accurately. As described in further detail below, the time of arrival information for the shockwave can be used to determine the projectile's trajectory: azimuth, elevation, and intercept with an arbitrary plane in the system coordinate frame. With additional information from the muzzle blast, an accurate location of the origin of the projectile and a line of bearing to the origin of the projectile can be determined. Even when the muzzle blast is masked, shadowed, silenced or otherwise distorted, at least the bullet trajectory can be estimated from the shockwave alone.

I/O adapter 18 connects non-volatile storage devices, such as magnetic disk units 20 and solid state storage units 22, to system bus 12. I/O adapter 18 also connects an acoustic sensor 24 to system bus 12. Acoustic sensor 24 is preferably configured as a single microphone sensor, which is capable of recording the acoustic signals due to firing a firearm. In addition, acoustic sensor 24 detects acoustic signals and detects (in combination with internal clock 16) the time of arrival of muzzle blast and the shockwave and hence the TDOA between the two.

Sniper localization apparatus 1 may further include a communication adapter 26 that optionally connects bus 12 to a wireless communication network 26a. Additionally, sniper localization apparatus 1 may also include a user interface and display adapter 28 that connects a touch screen device 28a, or other user interface devices, to the bus 12 to display output and gather user input.

Figure 2:
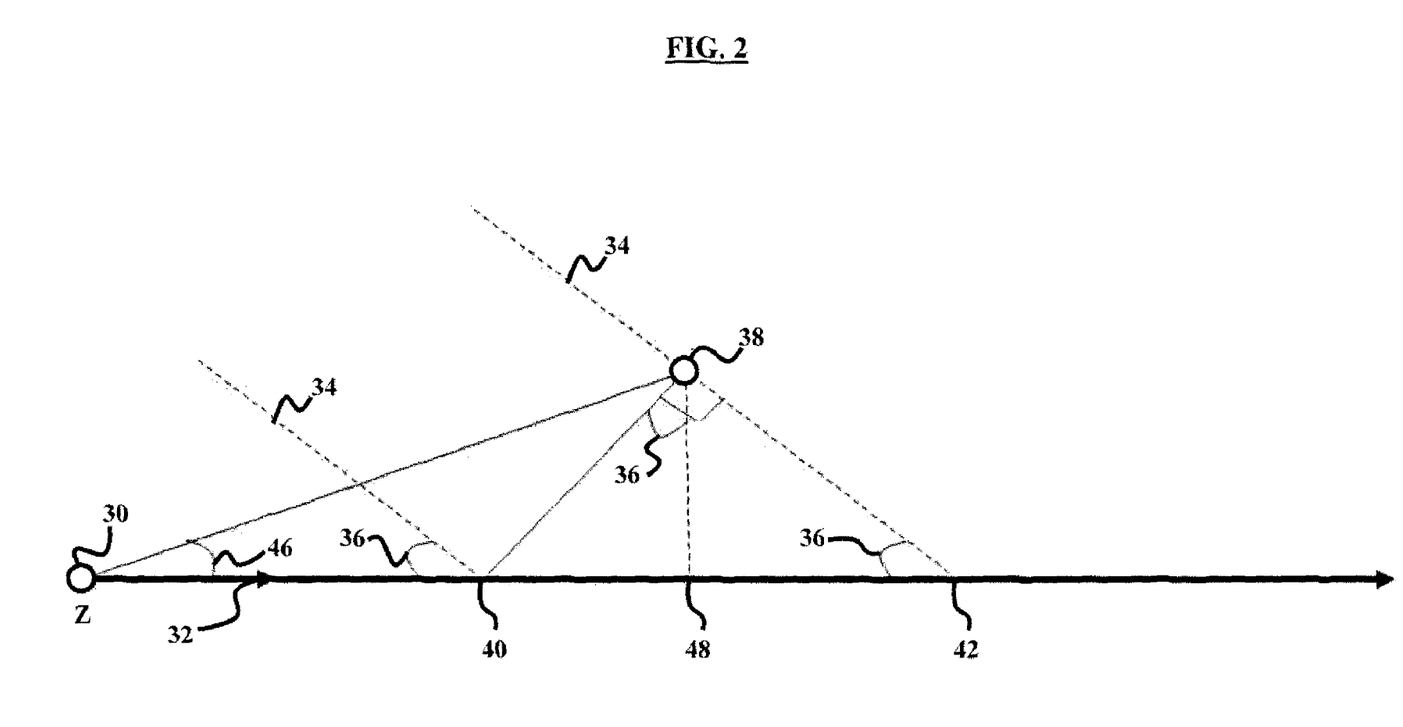
FIG. 2 illustrates a schematic diagram of locating a sniper's position, with a constant projectile speed, according to an embodiment herein.

FIG. 2, with reference to FIG. 1, illustrates a schematic diagram of the geometry of a bullet trajectory and the shockwave cone. In FIG. 2, sniper Z is located a position 30 and vector 32 (or U in the equations below) is the unit vector in the direction of a bullet (not shown) shot from position 30. As the bullet travels at supersonic speed, the shockwave created generates a shockwave cone 34 with angle 36 $\theta$, where $\sin\theta = 1/m$, m is the Mach number. The shockwave propagates perpendicular to the surface of shockwave cone 34 and reaches position 38 (or $S_k$ in the equations below) of acoustic sensor 24. The point where the shockwave radiates towards the sensor is denoted by position 40 (or $A_k$ in the equations below). By the time the shockwave reaches position 38, the bullet travels from position 40 to position 42 (or $C_k$ in the equations below) and the miss distance is the distance between the sensor $S_k$ and the projection of $S_k$ on to the trajectory denoted as position 48 (or $B_k$ in the equations below). The distance $h_k$ is defined as $h_k = \|S_k - B_k\|$, where $\|B\|$ denotes the norm of the vector B. In addition, angle 46 $\gamma_k$ is the angle between the trajectory of the bullet and the line joining sniper Z's position 30 and position 38 of acoustic sensor 24.

In the equations that follow, $T_k$ is the time of arrival of muzzle blast and $t_k$ is the shockwave, where $T_k$ and $t_k$ are described by Equation (1):

$$T_k = \frac{\|S_k - Z\|}{v}; t_k = \frac{\|A_k - Z\|}{mv} + \frac{\|S_k - A_k\|}{v} \qquad (1)$$

where v denotes the propagation velocity of the sound. Noting that in the time the shockwave propagates from position 40 to position 38 as shown in FIG. 2, the bullet travels from position 40 to position 42 and that implies that the bullet travels from position 30 to position 42 during the time period $t_k$. Therefore, $t_k$ can be re-written as Equation (2):

$$t_k = \frac{\|A_k - Z\|}{mv} + \frac{\|S_k - A_k\|}{v} = \frac{\|C_k - Z\|}{mv} \qquad (2)$$

$$t_k = \frac{\|B_k - Z\|}{mv} + \frac{\|C_k - B_k\|}{mv}$$

$$t_k = \frac{1}{mv}((S_k - Z)^T U + h_k \cot\theta)$$

where T is the transpose and noting that $\|B_k - Z\|$ is the projection of the vector $S_k - Z$ on to the trajectory of the bullet with vector 32. Trigonometric relations provide that $\|B_k-Z\|=\|S_k-Z\|\cos\gamma_k$ and $h_k=\|S_k-Z\|\sin\gamma_k$ and $\sin\theta=1/m$. Applying these trigonometric relations to the equations above produces Equation (3):

$$t_k = \frac{\|S_k - Z\|}{v}(\sin\theta\cos\gamma_k + \cos\theta\sin\gamma_k) \qquad (3)$$

$$t_k = \frac{\|S_k - Z\|}{v}\sin(\theta + \gamma_k)$$

and Equation (4):

$$\frac{(S_k - Z)^T U}{\|S_k - Z\|} = \cos\gamma_k. \qquad (4)$$

From Equations (1) and (3) shown above, the TDOA is shown below as Equation (5):

$$T_k - t_k = \frac{\|S_k - Z\|}{v}[1 - \sin(\theta + \gamma_k)] \qquad (5)$$

$$\|S_k - Z\| = \frac{d_k}{q_k}$$

where $d_k=v(T_k-t_k)$ and $q_k=[1-\sin(\theta+\gamma_k)]$. As discussed in further detail below, solving Equations (4) and (5) above describes the sniper location at position 30 and the trajectory of the bullet. In addition, v is known, the TDOA $(T_K-t_k)$ is measured by each sensor $S_k$ and the cone angle $\theta$ is also known. If $\gamma_k$ is known for all k, then Equations (4) and (5) can be solved exactly. Since the $\gamma_k$ is dependent on the location of the sniper Z, an iterative solution is derived that involves estimation of $\gamma_k$, Z and U.

Figure 3:
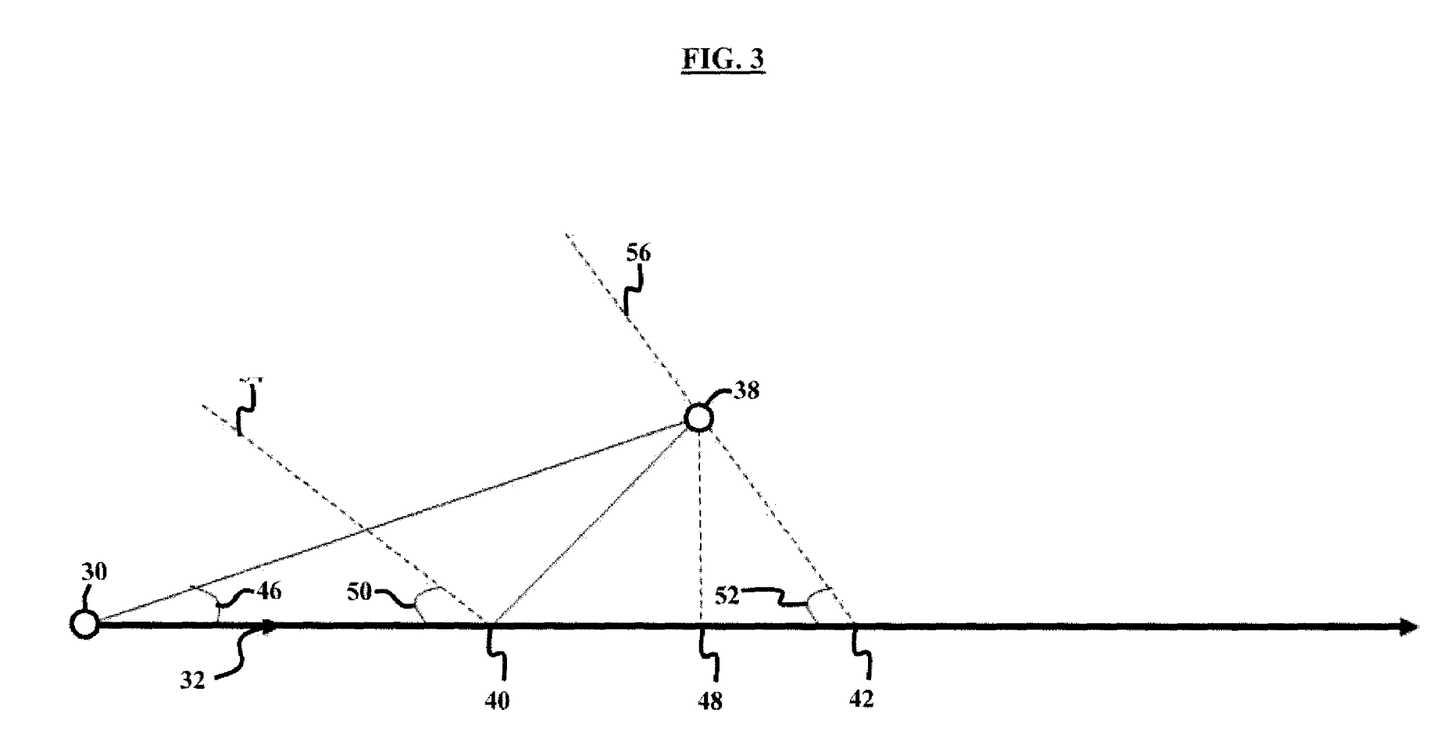
FIG. 3 illustrates a schematic diagram of locating a sniper's position, with a variable projectile speed, according to an embodiment herein.

FIG. 3, with reference to FIGS. 1 and 2, illustrates a schematic diagram of the geometry of a bullet trajectory and the shockwave cone, where the bullet (not shown) is subjected to resistance. In FIG. 3, angle 46 varies with respect to distance. Angle 50 is the angle that shockwave cone 54 propagates to position 40, but angle 50 is different than angle 52 when shockwave cone 54 reaches acoustic sensor 24. The difference in angles is attributable to a decrease in speed of the bullet (e.g., due to wind resistance). In spite of the decrease in speed, the bullet may be assumed to travel at an average of speed of Mach $m_1$ from position 30 to position 48 (or $B_k$ in the equations below) and $\sin\theta_1=1/m_1$. Therefore, a bullet travels from position 48 to position 42 at an average speed of Mach $m_2$ $\theta$=and a corresponding shockwave cone 56.

From FIG. 3, the time of arrival of shockwave cone 54 is given by Equation (6):

$$t_k = \frac{\|B_k - Z\|}{m_1 v} + \frac{\|C_k - B_k\|}{m_2 v} \qquad (6)$$

$$t_k = \frac{\|S_k - Z\|}{v}\left(\frac{\cos\gamma_k}{m_1} + \frac{\sin\gamma_k}{m_2}\cot\theta_2\right)$$

$$t_k = \frac{\|S_k - Z\|}{v}[\sin\theta_1\cos\gamma_k + \cos\theta_2\sin\gamma_k]$$

$$t_k = \frac{\beta\|S_k - Z\|}{v}\sin(\alpha + \gamma_k)$$

where $$\beta = \sqrt{\sin^2\theta_1 + \cos^2\theta_2} \text{ and } \alpha = \sin^{-1}(\sin\theta_1/\beta).$$

Then, the TDOA is described by Equation (7):

$$T_k - t_k = \frac{\|S_k - Z\|}{v}[1 - \beta\sin(\alpha + \gamma_k)] \qquad (7)$$

$$\|S_k - Z\| = \frac{d_k}{w_k}$$

where $w_k=1-\beta\sin(\alpha+\gamma_k)$ and $d_k=v(T_k-t_k)$. Similar to what was described above for FIG. 2, the unit vector in the direction of bullet trajectory is related to $\gamma_k$ by Equation (8):

$$\frac{(S_k - Z)^T U}{\|S_k - Z\|} = \cos\gamma_k. \qquad (8)$$

As previously mentioned, solving Equations (4) and (5), shown above in relation to FIG. 2, identifies sniper position 30 (shown in FIGS. 2 and 3) and the trajectory of a bullet (not shown) shot from position 30. Similarly, solving Equations (7) and (8) identifies the sniper position 30 shown in FIG. 3 for two velocity models. While in the case of Equations (4) and (5) one would require to know one Mach number for the bullet, in the case of Equations (7) and (8) one would require to know two Mach numbers $m_1$ and $m_2$.

In the solution to Equations (4) and (5) discussed below, $\overline{Z}=[x_z, y_z, z_z]^T$ and is a three-dimensional vector depicting position 30. In addition, the bullet is traveling along the trajectory that is defined by the unit vector $\overline{U}=[\sin\phi\cos\varphi \sin\phi\sin\varphi \cos\phi]^T$ where $\phi$ and $\varphi$ represent the elevation and azimuth angles of the trajectory and T denotes the transpose. In addition, $\|\overline{U}\|^2=\overline{U}^T\overline{U}=1$. Equation (8), shown above in relation to FIG. 3, requires a similar solution to what is described below for FIG. 2. Therefore, Equation (8) will not be discussed further because those skilled in the art would capable of applying the discussion below to the Equation (8) without undue experimentation.

As discussed in further detail below, vector Z is describe by using Equation (5) and substituting in the estimated value of Z in Equation (5) to estimate the angles $\gamma_k$ for all k. Squaring both sides of Equation (1) produces Equation (9):

$$(\overline{S}_k - \overline{Z})^T(\overline{S}_k - \overline{Z}) = \left(\frac{d_k}{q_k}\right)^2 \qquad (9)$$

$$\|\overline{S}_k\|^2 - 2\overline{S}_k^T\overline{Z} + \|\overline{Z}\|^2 = \left(\frac{d_k}{q_k}\right)^2.$$

Setting the value of k={1, 2, ..., N} in Equation (9) and taking the difference between pairs, produces the linear equations shown below as Equation (10):

$$2\begin{bmatrix} (\bar{S}_1 - \bar{S}_2)^T \\ \vdots \\ (\bar{S}_1 - \bar{S}_N)^T \\ (\bar{S}_2 - \bar{S}_3)^T \\ \vdots \\ (\bar{S}_{N-1} - \bar{S}_N)^T \end{bmatrix} [Z] = \begin{bmatrix} \left(\frac{d_2}{q_2}\right)^2 - \left(\frac{d_1}{q_1}\right)^2 + \|\bar{S}_1\|^2 - \|\bar{S}_2\|^2 \\ \vdots \\ \left(\frac{d_N}{q_N}\right)^2 - \left(\frac{d_1}{q_1}\right)^2 + \|\bar{S}_1\|^2 - \|\bar{S}_N\|^2 \\ \left(\frac{d_3}{q_3}\right)^2 - \left(\frac{d_2}{q_2}\right)^2 + \|\bar{S}_2\|^2 - \|\bar{S}_3\|^2 \\ \vdots \\ \left(\frac{d_N}{q_N}\right)^2 - \left(\frac{d_{N-1}}{q_{N-1}}\right)^2 + \|\bar{S}_{N-1}\|^2 - \|\bar{S}_N\|^2 \end{bmatrix}. \quad (10)$$

In Equation (10), $\bar{S}_k$ is position 38 of acoustic sensor 24 and $d_k$ is the product of propagation velocity v and the difference in the time of muzzle blast and shockwave $(T_k-t_k)$ at acoustic sensor 24. Solving the linear equations shown above in Equation (10) requires values of $q_k$ for all k. However, from Equation (6) above, $q_k=1-\sin(\theta+\gamma_k)$, where $\theta=\sin^{-1}(1/m)$, where the Mach number (m) is assumed to be known. In general, $\gamma_k$ is small when the distance between the sniper location 30 and the sensor 24 is greater than 200 m and the distance between the bullet's path and the sensor is less than 10 m. For example, to calculate an initial estimate of the sniper location at position 30, based on the equations above, $\gamma_k=0.01$ is arbitrarily set for all k. In Equation (11) below, $\tilde{Z}$ is the initial estimate of the sniper location at position 30 and $\tilde{Z}$ can be used in Equation (5) to estimate the approximate values of $\gamma_k$, which is $\hat{\gamma}_k$ and shown as Equation (11):

$$\hat{\gamma}_k = \sin^{-1}\left(1 - \frac{d_k}{\|\bar{S}_k - \tilde{Z}\|}\right) - \theta, \quad (11)$$

$$\forall k = \{1, 2, \ldots, N\}.$$

In Equation (3) above, $\hat{\gamma}_k$ is used to solve for approximate trajectory $\tilde{U}$ using the system of linear equations given by Equation (4) and re-written in a matrix form as shown below as Equation (12):

$$\begin{bmatrix} (\bar{S}_1 - \tilde{Z})^T \\ (\bar{S}_2 - \tilde{Z})^T \\ \vdots \\ (\bar{S}_N - \tilde{Z})^T \end{bmatrix} [\tilde{U}] = \begin{bmatrix} \|\bar{S}_1 - \tilde{Z}\|\cos\hat{\gamma}_1 \\ \|\bar{S}_2 - \tilde{Z}\|\cos\hat{\gamma}_2 \\ \vdots \\ \|\bar{S}_N - \tilde{Z}\|\cos\hat{\gamma}_N \end{bmatrix} \quad (12)$$

which can be solved for $\tilde{U}$ using regression. Substituting $\tilde{Z}$ and $\tilde{U}$ in Equation (4) above to solve for $\gamma_k$ results in Equation (13):

$$\check{\gamma}_k = \cos^{-1}\left[\frac{(\bar{S}_k - \tilde{Z})^T \tilde{U}}{\|\bar{S}_k - \tilde{Z}\|}\right], \quad (13)$$

$$\forall k = \{1, 2, \ldots, N\}.$$

Ideally, if the values of $\tilde{Z}=\check{Z}$, and $\tilde{U}=\check{U}$ the values of $\hat{\gamma}_k$ and $\check{\gamma}_k$ calculated using the Equations (11) and (13) respectively, are equal resulting in determining the sniper location and the bullet's trajectory.

Figure 4:
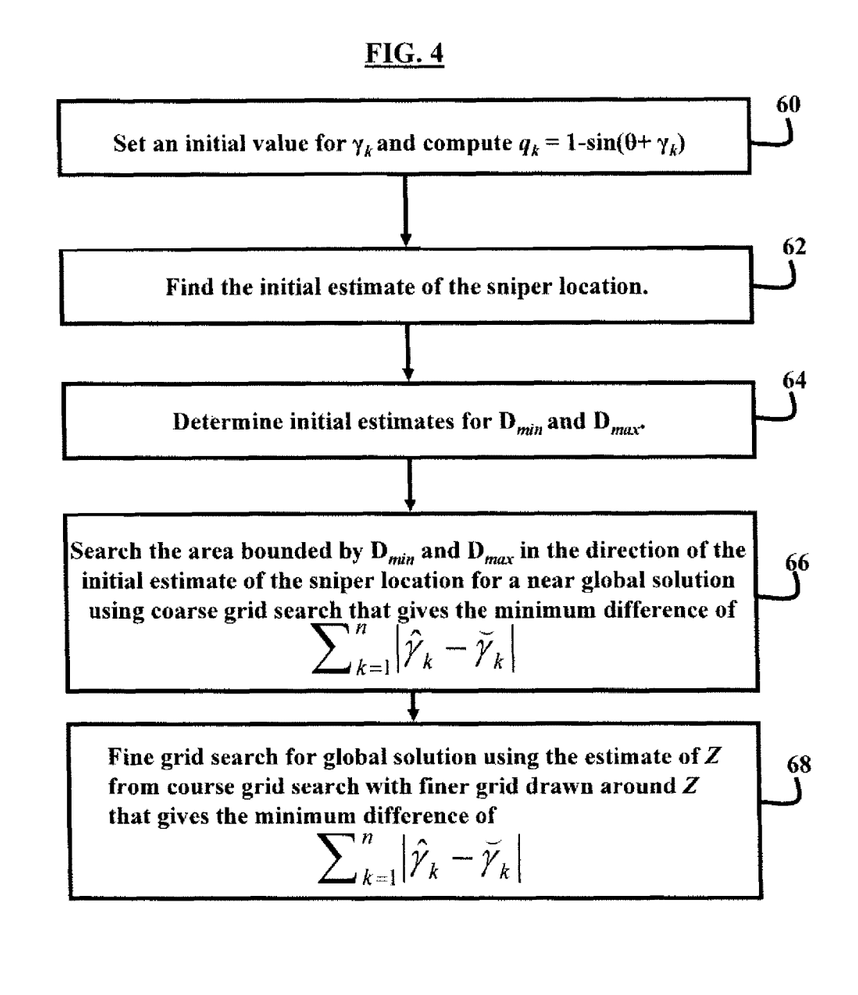
FIG. 4 is a flow diagram illustrating a preferred method according to an embodiment herein.
Figure 5:
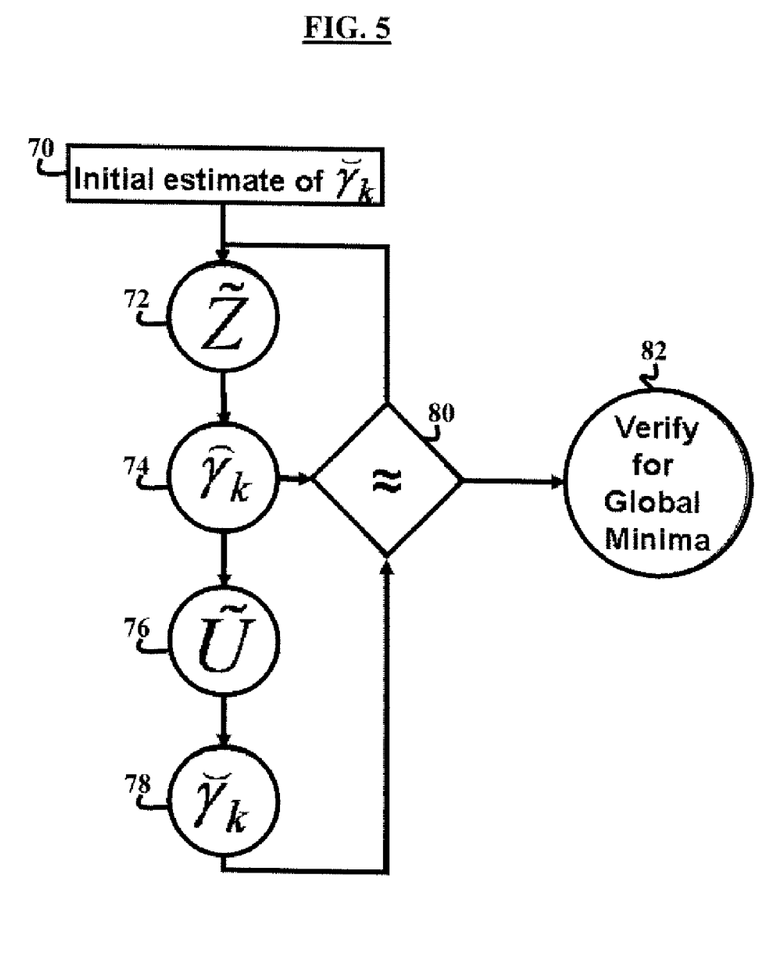
FIG. 5 is a flow diagram illustrating a method of finding a minimal distance of a sniper according to an embodiment herein.

FIGS. 4 and 5, with reference to FIGS. 1 through 3, are flow diagrams illustrating a method for estimating a sniper's location based on acoustic information gathered from acoustic sensors (e.g., acoustic sensor 24) and accurate timing of when the acoustic information is gathered from an accurate timing device (e.g., internal clock 16). Step 60, of the method shown in FIG. 4, initially sets $\gamma_k=0.01$ for all k and computes $q_k=1-\sin(\theta+\gamma_k)$. Step 62 estimates an initial sniper location $\tilde{Z}$ using Equations (10)-(13) as shown in FIG. 5, which is further elaborated below. Step 64 determines the initial minimal and maximum distances values from a sniper located at position 30 (shown in FIGS. 2 and 3) to the acoustic sensor 24 location at position 38 (shown in FIGS. 2 and 3). The minimum distance is determined by the fact that $\gamma_k \geq 0, \forall k$. Setting $\gamma_k=0$ in Equation (5) and maximizing the distance as in Equation (14) below:

$$D_{min} = \max_{k=1,2,\ldots,N} \frac{d_k}{1 - \sin\theta} \quad (14)$$

and the $D_{max}$ is determined the muzzle blast detection capability of the acoustic sensor 24, which is approximately 500 m.

Step 66 estimates the rough location of the sniper firing point and the approximate trajectory of the projectile using coarse grid search. When determining the coarse location of the sniper firing point, the following excerpt of pseudo-code may be used, as a non-limiting example:

Let $\tilde{Z} = [X_z \ Y_z \ Z_z]^T = [0 \ 0 \ 0]^T$ then
num = 0;
for i = $X_{min}$ :$X_{inc}$ :$X_{max}$
  for j = $Y_{min}$ :$Y_{inc}$ :$Y_{max}$
    for k = $Z_{min}$ :$Z_{inc}$ :$Z_{max}$
      Z_new = $[X_z + i, Y_z + j, Z_z + k]^T$ Use Z_new in equation (11) to estimate the $\hat{\gamma}_k$ for all k.

Use Z_new and $\hat{\gamma}_k$ in equation (12) to estimate the trajectory of the bullet $\tilde{U}$.

Use Z_new and $\tilde{U}$ in equation (13) to estimate the $\check{\gamma}_k$.

num = num + 1;

Compute $g(num) = \sum_{k=1}^{N} |\hat{\gamma}_k - \check{\gamma}_k|$ end
  end
end where $X_{min}, X_{max}, Y_{min}, Y_{max}, Z_{min}, Z_{max}$ are determined by the $D_{min}$ and $D_{max}$. The $X_{inc}, Y_{inc}, Z_{inc}$ are arbitrarily set to 10 m. The pseudo-code shown above is intended only as an example of how the initial coarse location of the sniper firing point and the trajectory may be computed and is not shown in any particular computer programming language or computer interpretable format. While not representing a specific computer programming language, shown in the pseudo-code above is an example of how it may be easily converted to any particular computer programming language by those skilled in the art. As discussed in greater detail below, while executing steps 66 and 68, the method shown in FIG. 4 can use the method shown in FIG. 5 with initial estimate of $\hat{\gamma}_k$ using $Z_{new}$ in Equation (11). This invocation of algorithm presented in FIG. 5 allows the search to occur around the $Z_{new}$ as opposed to finding the fitness just at $Z_{new}$.

In Step 68, the method of FIG. 4 finds the final solution, that is, the sniper firing position and the trajectory. This step is similar to the Step 66 with search space set around the solution obtained in Step 66. If the solution in Step 66 is denoted by $\tilde{Z}=[X_z Y_z Z_z]^T$, and set $X_{min}=X_z-5$; $X_{max}=X_z+5$; $Y_{min}=Y_z-5$; $Y_{max}=Y_z+5$, and $Z_{min}=Z_z-5$; $Z_{max}=Z_z+5$ in the pseudo code provided above to estimate the final position of the sniper firing location and the trajectory.

FIG. 5, with reference to FIGS. 1 through 4, is a schematic diagram of step 62 shown in FIG. 4, as related to the Equations (1) through (13) described above. In step 70 of the method shown in FIG. 5, an initial value for $\check{\gamma}_k$ is set (e.g., $\check{\gamma}_k=0.01$). Step 72 uses the initial value of $\gamma_k$, set in step 70, to compute $\tilde{Z}$ as described in Equation (10) shown above. Step 74 uses the value of $\tilde{Z}$ computed in step 72 to compute a value for $\hat{\gamma}_k$ using Equation (11) shown above. Step 76 uses the value of $\hat{\gamma}_k$ computed in step 74 to compute the value of $\tilde{U}$ using Equation (12) shown above. Step 78 uses the value of $\tilde{U}$ computed in step 76 to compute the value of $\check{\gamma}_k$ using Equation (13) shown above. In step 80, the method shown in FIG. 5 determines whether the value of $\check{\gamma}_k$ computed in step 78 is approximately equal to the value of $\gamma_k$ computed in step 74. In Step 80, the value $$g(num) = \sum_{k=1}^{N} |\hat{\gamma}_k - \check{\gamma}_k|$$

is computed for each iteration number 'num' and the iterations terminate when $g(num) > g(num-1)$. Step 82 is used to find the global minima and it may involve searching several values of Z that give minimal difference of $$\sum_{k=1}^{N} |\hat{\gamma}_k - \check{\gamma}_k|$$

as in steps 66 and 68.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein may comprise hardware and software embodiments. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
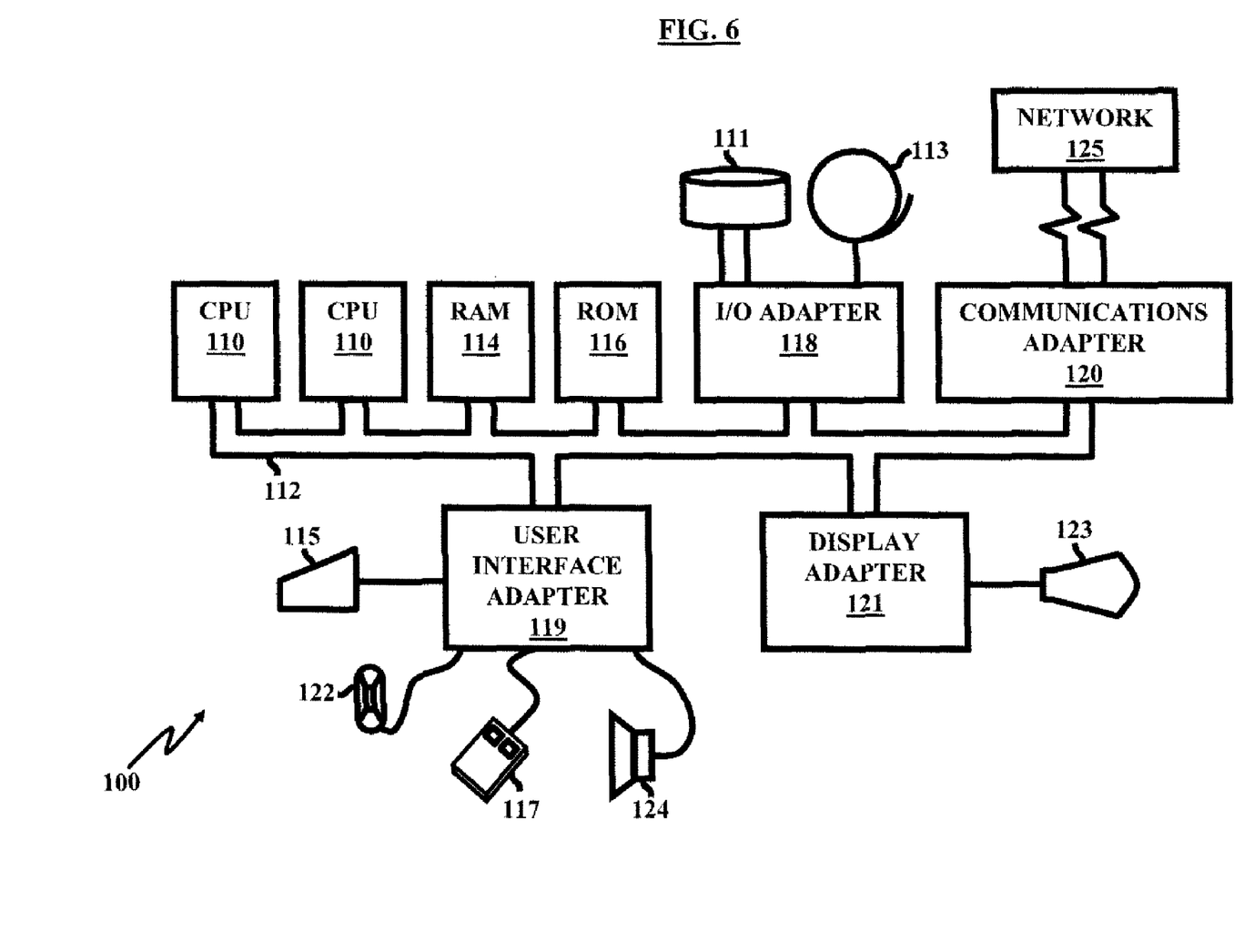
FIG. 6 illustrates a schematic diagram of a computer architecture used in accordance with the embodiments herein.

A more general representation of the hardware environment for practicing the embodiments herein is depicted in FIG. 6. This schematic drawing illustrates hardware configuration 100 of an information handling/computer system in accordance with the embodiments herein. Hardware configuration 100 comprises at least one processor or central processing unit (CPU) 110. The CPUs 110 are interconnected via system bus 112 to various devices such as a random access memory (RAM) 114, read-only memory (ROM) 116, and an input/output (I/O) adapter 118. The I/O adapter 118 can connect to peripheral devices, such as disk units 111 and tape drives 113, or other program storage devices that are readable by the system. The system can read the inventive instructions on the program storage devices and follow these instructions to execute the methodology of the embodiments herein. The system further includes a user interface adapter 119 that connects a keyboard 115, mouse 117, speaker 124, microphone 122, and/or other user interface devices such as a touch screen device (not shown) to the bus 112 to gather user input. Additionally, a communication adapter 120 connects the bus 112 to a data processing network 125, and a display adapter 121 connects the bus 112 to a display device 123 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for determining the trajectory of a supersonic projectile and firing position of said trajectory, said system comprising:
   an internal clock;
   a set of acoustic sensors positioned in a known locations and encountering pressure waves generated by said supersonic projectile passing proximate to said acoustic sensors, said acoustic sensors comprising a transducer collecting pressure wave information and generating pressure wave information signals in response to said pressure waves, the pressure wave information signals having a time series information signal calibrated to said internal clock;
   a first processor processing said time series information signal to provide parameter information for determining said trajectory of said supersonic projectile; said first processor comprising:
   a shock wave threshold detector receiving said time series information and recording arrival times of shock wave components of said pressure waves;
   a blast threshold detector receiving said time series information and recording arrival times and amplitude information of potential blast wave components of said pressure waves;
   a discrimination processor discriminating said potential blast wave components to classify each of said potential blast wave components as a blast wave, a shock wave, or neither, and storing arrival times of each of said potential blast wave components classified as said blast wave; and
   a localization estimation processor calculating an estimated trajectory of said projectile based on said blast wave and said shock wave arrival times and calculating an estimated firing position of said projectile,
   wherein said localization estimation processor calculates an initial gamma estimate and calculates said estimated trajectory of said projectile and said estimated firing position of said projectile from said initial gamma estimate,
   wherein said localization estimation processor calculates $$g(num) = \sum_{k=1}^{N} |\hat{\gamma}_k - \check{\gamma}_k|$$

from said estimated firing position of said projectile based on said initial gamma estimate, where $$\hat{\gamma}_k = \sin^{-1}\left(1 - \frac{d_k}{\|\overline{S}_k - \tilde{Z}\|}\right) - \theta,$$

$$\forall k = \{1, 2, \ldots, N\},$$

and k is said acoustic sensor, $\overline{S}_k$ is a three-dimensional position vector of the $k^{th}$ sensor S, $\tilde{Z}$ is said initial estimate of said sniper position, and d is an estimated distance, and $$\check{\gamma}_k = \cos^{-1}\left[\frac{(\overline{S}_k - \tilde{Z})^T \tilde{U}}{\|\overline{S}_k - \tilde{Z}\|}\right],$$

$$\forall k = \{1, 2, \ldots, N\},$$

and N is the number of acoustic sensors, $\overline{S}_k$ is a three-dimensional position vector of the $n^{th}$ sensor S, $\tilde{Z}$ is said initial estimate of said sniper position, d is an estimated distance, $\tilde{U}$ is an estimated trajectory of said projectile, and $\check{\gamma}_k$ is an estimate of $\gamma_1$ that includes $\tilde{U}$, and, wherein said localization estimation processor outputs said estimated firing position of said projectile based on said initial gamma estimate when said localization estimation processor determines the calculated g(num) is less than said initial gamma estimate, otherwise said localization estimation processor calculates said estimated firing position of said projectile from a new gamma chosen from said estimated minimum and said maximum distance of said estimated firing position of said projectile.

2. A method for estimating a firing position of a supersonic projectile, said projectile producing a pressure wave, said pressure wave comprising at least a shock wave and a blast wave, said method comprising:
   positioning set of acoustic sensor in a known locations;
   generating pressure wave information signals at said acoustic sensors in response to said pressure wave;
   filtering unwanted harmonics in said pressure wave information signal;
   converting said filtered pressure information signal into a time series signal;
   recording shock wave arrival times of shock wave components of said pressure wave;
   recording blast wave arrival times of blast wave components of said pressure wave;
   determining a shock wave arrival time of said shock wave components and an blast wave arrival time of said blast wave components; and
   calculating an estimated firing position of said projectile based on said shock wave arrival time and said blast wave arrival times,
   wherein calculating an estimated firing position of said projectile comprises calculating $$g(num) = \sum_{k=1}^{N} |\hat{\gamma}_k - \check{\gamma}_k|$$

from said estimated firing position of said projectile based on said initial gamma estimate, where $\check{\gamma}_k$ and $\hat{\gamma}_k$ are minimum and maximum angle estimates, respectively, and
   wherein calculating an estimated firing position of said projectile comprises:
   outputting said estimated firing position of said projectile based on said initial gamma estimate when said localization estimation processor determines the calculated g(num) is less than said initial gamma estimate, otherwise
   calculating said estimated firing position of said projectile from a new gamma chosen from said estimated minimum and said maximum distance of said estimated firing position of said projectile.

3. A method for estimating a sniper position firing a supersonic projectile, said projectile producing a pressure wave, said pressure wave have at least a shock wave and a blast wave and said pressure wave is detected by an acoustic sensor, said method comprising:
   detecting an acoustic signal from a firearm with a microphone,
   inputting the acoustic signal from the microphone through an input output device, sending the signal from the input output device to a clock, at least one central processing unit (CPU), a random access memory (RAM), a communications adapter, and a storage device, activating a computer program inside of at least one of the CPU's to do the following:

setting an initial value for a miss angle, $\hat{\gamma}_k = \gamma_1$, for all k, and subsequent values of $\hat{\gamma}_k$ calculated using equation 11 with the estimated position of the sniper $\tilde{Z}$ determining a value for an intercept angle, $\theta$;

computing $q_k$, where $q_k = 1 - \sin(\theta + \hat{\gamma}_k)$;

computing an initial estimate of said sniper position based on said $\hat{\gamma}_k$ and said $q_k$;

determining an initial estimate for a minimal distance of said sniper position measured from said acoustic sensor and a maximum distance of said sniper position measured from said acoustic sensor, based on said $\hat{\gamma}_k$ and said $q_k$;

calculating an adjusted miss angle, $\check{\gamma}_k = \gamma_2$ using equation 13, based on coordinates bounded by said minimal distance of said sniper position and said maximum distance of said sniper position; and searching an area bounded by said minimal distance of said sniper position and said maximal distance of said sniper position for a global a minimum value of $$g(num) = \sum_{k=1}^{N} |\hat{\gamma}_k + \check{\gamma}_k|$$

displaying the result of CPU's process, that being the location of the origin of the acoustic signal from the firearm to a user interface and display adapter and finally to a user display.

4. The method of claim 3, wherein setting an initial value for miss angle $\gamma$ sets $\gamma_1$ to 0.01.

5. The method of claim 3, wherein said computing an initial estimate of said sniper position based on said $\gamma 1$ and said q comprises computing:

$$2\begin{bmatrix} (\bar{S}_1 - \bar{S}_2)^T \\ \vdots \\ (\bar{S}_1 - \bar{S}_N)^T \\ (\bar{S}_2 - \bar{S}_3)^T \\ \vdots \\ (\bar{S}_{N-1} - \bar{S}_N)^T \end{bmatrix}[Z] = \begin{bmatrix} \left(\frac{d_2}{q_2}\right)^2 - \left(\frac{d_1}{q_1}\right)^2 + \|\bar{S}_1\|^2 - \|\bar{S}_2\|^2 \\ \vdots \\ \left(\frac{d_N}{q_N}\right)^2 - \left(\frac{d_1}{q_1}\right)^2 + \|\bar{S}_1\|^2 - \|\bar{S}_N\|^2 \\ \left(\frac{d_3}{q_3}\right)^2 - \left(\frac{d_2}{q_2}\right)^2 + \|\bar{S}_2\|^2 - \|\bar{S}_3\|^2 \\ \vdots \\ \left(\frac{d_N}{q_N}\right)^2 - \left(\frac{d_{N-1}}{q_{N-1}}\right)^2 + \|\bar{S}_{N-1}\|^2 - \|\bar{S}_N\|^2 \end{bmatrix}$$

where N is the number of acoustic sensors, $S_k$ is a position of said acoustic sensor, Z is an estimate of said sniper position, $d_k$ is an estimated distance, and $q_k = 1 - \sin(\theta + \hat{\gamma}_k)$.

6. The method of claim 3, wherein said computing an initial estimate of said sniper position based on said $\gamma_1$ and said g comprises computing:

$$\hat{\gamma}_k = \sin^{-1}\left(1 - \frac{d_k}{\|\bar{S}_k - \tilde{Z}\|}\right) - \theta,$$

$$\forall k = \{1, 2, \ldots, N\}$$

where k is said acoustic sensor, $\bar{S}_k$ is a three-dimensional position vector of the $k^{th}$ sensor S, $\tilde{Z}$ is said initial estimate of said sniper position, and d is an estimated distance.

7. The method of claim 3, wherein said computing an initial estimate of said sniper position based on said $\gamma_1$ and said q comprises computing:

$$\begin{bmatrix} (\bar{S}_1 - \tilde{Z})^T \\ (\bar{S}_2 - \tilde{Z})^T \\ \vdots \\ (\bar{S}_N - \tilde{Z})^T \end{bmatrix}[\tilde{U}] = \begin{bmatrix} \|\bar{S}_1 - \tilde{Z}\|\cos\hat{\gamma}_1 \\ \|\bar{S}_2 - \tilde{Z}\|\cos\hat{\gamma}_2 \\ \vdots \\ \|\bar{S}_N - \tilde{Z}\|\cos\hat{\gamma}_N \end{bmatrix}$$

where N is the number of acoustic sensors, $\bar{S}_k$ is a three-dimensional position vector of the $n^{th}$ sensor S, $\tilde{Z}$ is said initial estimate of said sniper position, d is an estimated distance, $\tilde{U}$ is an estimated trajectory of said projectile, and $\hat{\gamma}_k$ is an estimate of $\gamma_1$.

8. The method of claim 3, wherein said computing an initial estimate of said sniper position based on said $\gamma_1$ and said q comprises computing:

$$\check{\gamma}_k = \cos^{-1}\left[\frac{(\bar{S}_k - \tilde{Z})^T \tilde{U}}{\|\bar{S}_k - \tilde{Z}\|}\right]$$

where N is the number of acoustic sensors, $\bar{S}_k$ is a three-dimensional position vector of the $n^{th}$ sensor S, $\tilde{Z}$ is said initial estimate of said sniper position, d is an estimated distance, $\tilde{U}$ is an estimated trajectory of said projectile, and $\check{\gamma}_k$ is an estimate of $\gamma_1$ that includes $\tilde{U}$.

* * * * *